(12) United States Patent
Battistini (10) Patent No.: US 10,899,413 B2
(45) Date of Patent: Jan. 26, 2021

(54) MOTORCYCLE CLAMP AND HANDLEBAR ASSEMBLY

(71) Applicant: RJB Design, Wilmington, DE (US)

(72) Inventor: Rikki Martin Battistini, Orange, CA (US)

(73) Assignee: RJB Design, Wilmington, DE (US)

( * ) Notice: Subject to any disclaimer, the term of this patent is extended or adjusted under 35 U.S.C. 154(b) by 125 days.

(21) Appl. No.: 16/171,729

(22) Filed: Oct. 26, 2018

(65) Prior Publication Data
US 2019/0367123 A1    Dec. 5, 2019

Related U.S. Application Data

(60) Provisional application No. 62/680,148, filed on Jun. 4, 2018.

(51) Int. Cl.
*B62K 21/16* (2006.01)
*B62K 21/18* (2006.01)
*B62K 21/26* (2006.01)

(52) U.S. Cl.
CPC .............. *B62K 21/16* (2013.01); *B62K 21/18* (2013.01); *B62K 21/26* (2013.01)

(58) Field of Classification Search
CPC ...... B62K 21/16; B62K 21/125; B62K 21/12; B62K 21/24; B62K 21/22; B62K 21/18; B62K 21/06; B62K 21/02; B62K 21/04; B62K 11/14; B62K 21/26; Y10T 74/20792; Y10T 74/20798; Y10T 74/20804; Y10T 74/2081; Y10T 74/2078; Y10T 74/20822; B62J 6/16
See application file for complete search history.

(56) References Cited

U.S. PATENT DOCUMENTS

| | | | | |
|---|---|---|---|---|
| 578,180 | A * | 3/1897 | Wood | B62K 21/16 74/551.4 |
| 3,942,822 | A * | 3/1976 | Lewis | B62K 21/16 74/551.3 |
| 4,023,436 | A * | 5/1977 | Dodge | B62K 21/16 74/551.3 |
| 5,685,201 | A * | 11/1997 | Renshaw | B62K 21/16 280/278 |
| 6,860,500 | B2 * | 3/2005 | Hissam | B62K 21/14 280/276 |
| 8,230,758 | B1 * | 7/2012 | Eddy | B62K 21/16 74/551.1 |

(Continued)

FOREIGN PATENT DOCUMENTS

| | | | | |
|---|---|---|---|---|
| FR | 1037279 A | * | 9/1953 | ............. B62K 21/16 |
| FR | 1086626 A | * | 2/1955 | ............. B62K 21/16 |

OTHER PUBLICATIONS

EPO Translation of the Description of FR 1086626, Isoart, Feb. 15, 1955. (Year: 2020).*

*Primary Examiner* — Daniel D Yabut
(74) *Attorney, Agent, or Firm* — Raymond Sun (57) ABSTRACT

A handlebar assembly for a motorcycle has a cylindrical connecting rod having opposing first and second ends, a first end joint connected to the first end, and a second end joint connected to the second end, with each end joint having a vertical channel. The assembly also includes two handlebars, each handlebar having a vertical bar that has a lower end that is removably secured inside the vertical channel of one of the end joints.

4 Claims, 12 Drawing Sheets

(56) References Cited

U.S. PATENT DOCUMENTS

| | | | |
|---|---|---|---|
| 2005/0116442 A1* | 6/2005 | Law | B62K 11/14 |
| | | | 280/279 |
| 2005/0211010 A1* | 9/2005 | Zimmerman | B62K 11/14 |
| | | | 74/551.1 |
| 2008/0315551 A1* | 12/2008 | Battistini | B62K 21/18 |
| | | | 280/279 |
| 2009/0000419 A1* | 1/2009 | Wind | B62K 21/12 |
| | | | 74/551.1 |
| 2009/0007714 A1* | 1/2009 | Carlini | B62K 21/12 |
| | | | 74/492 |
| 2009/0188344 A1* | 7/2009 | Tamcsin | B62K 21/16 |
| | | | 74/551.4 |
| 2011/0100741 A1* | 5/2011 | King | B62K 21/16 |
| | | | 180/219 |
| 2011/0215549 A1* | 9/2011 | Plainfield | B62K 21/12 |
| | | | 280/270 |
| 2014/0137699 A1* | 5/2014 | Hutto | B62K 21/16 |
| | | | 74/551.4 |

* cited by examiner

MOTORCYCLE CLAMP AND HANDLEBAR ASSEMBLY

BACKGROUND OF THE INVENTION

1. Field of the Invention

The present invention relates to motorcycle accessories, and in particular, to a clamp and handlebar assembly.

2. Description of the Prior Art

Figure 1A:
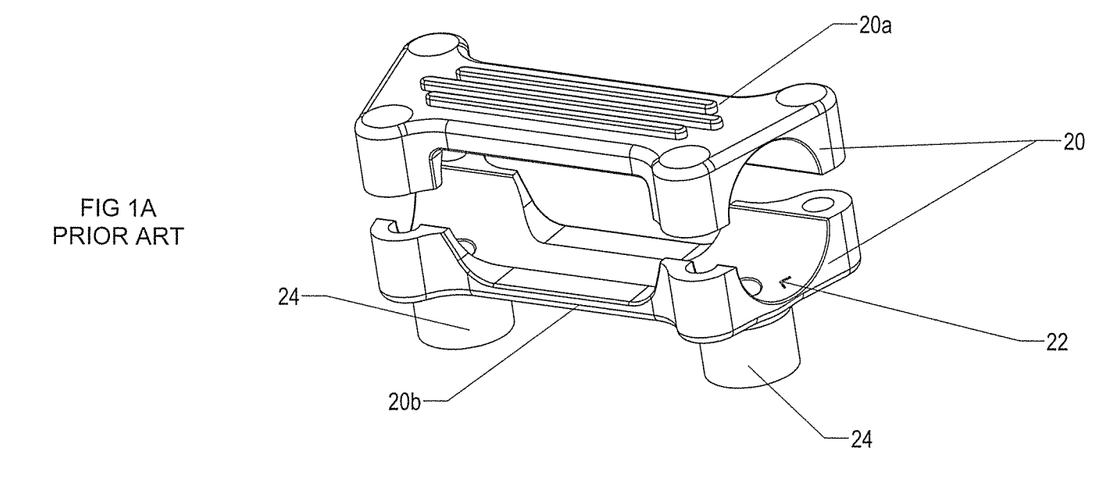
FIG. 1A is an exploded perspective view of a conventional motorcycle clamp.
Figure 1B:
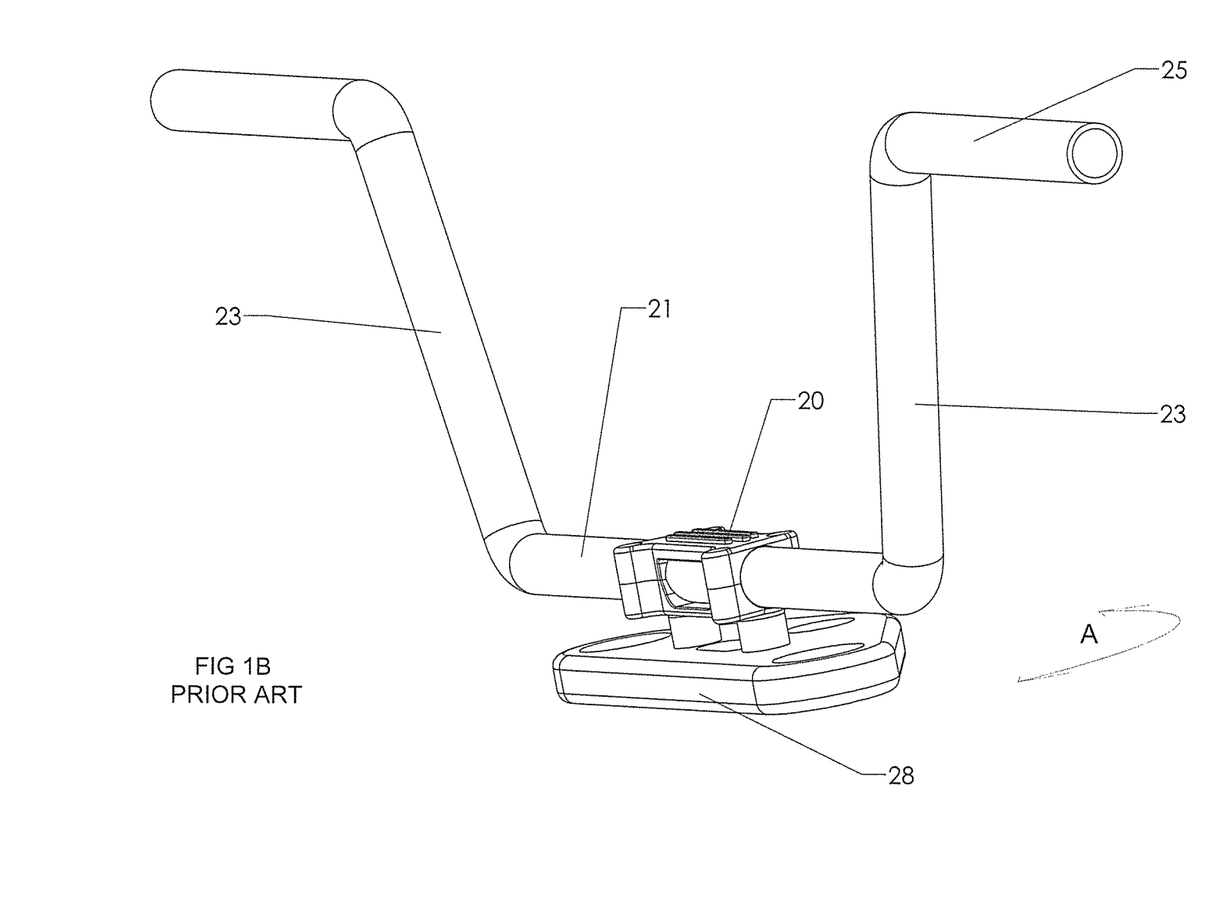
FIG. 1B illustrates a conventional motorcycle clamp and handlebar assembly.

All motorcycles include a handlebar that extends from opposite sides of the chassis. For example, on a Harley-Davidson™ motorcycle handlebars are part of a unitary handlebar piece that is secured to the triple tree clamp on a motorcycle. The unitary handlebar piece typically comprises a horizontal rod 21 with a handlebar 23 extending upwardly from each end of the horizontal rod. Referring to FIGS. 1A and 1B, the conventional Harley-Davidson™ clamp 20 is usually made in two pieces and has a lower clamp piece 20b that has two clamp legs 24 that are secured to two clamp joints of the triple tree clamp 28 of the motorcycle, and an upper clamp piece 20a that is secured to the lower clamp piece 20b. A horizontal cylindrical bore or channel 22 extends through the clamp pieces, and the horizontal rod is seated inside the channel. The two clamp pieces 20a, 20b are then tightened to secure the horizontal rod 21 inside the channel 22. One benefit offered by this clamp and handlebar assembly is that orientation of the handlebars 23 can be adjusted by rotating the horizontal rod 21 inside the channel 22, with the rotation bringing the handlebars 23 closer to or further away from the rider. See arrow A.

This conventional clamp and handlebar assembly suffers from a serious drawback in that the horizontal tube can still experience rotation inside the channel 22 even if the two clamp pieces 20a, 20b are tightly secured together because the tube can compress. For example, if the motorcycle brakes or stops suddenly, the handlebars can pivot forwardly causing the horizontal rod to pivot or rotate within the clamped channel 22. This will require the rider to re-adjust the handlebar assembly, which can be troublesome.

Another drawback of the conventional clamp and handlebar assembly is that the angle of the ends 25 on the handlebar 23 cannot be adjusted and this affects the wrist angle of the rider and the overall rider position. Specifically, during this rotation, the angle of the ends 25 of the handlebars 23 changes around the centerline of the channel 22. However, the angle of the handlebar ends 25 remains constant because the handlebars 23 cannot be rotated about the arrow B, thereby making it uncomfortable for the rider.

Finally, because the handlebar 23 is made of one piece, it is not possible to obtain tight curves on the bends without cutting and welding joints which cause extra failure points.

Thus, there is still a need for a clamp and handlebar assembly that offers the same adjustability as the conventional Harley-Davidson™ clamp and handlebar but which overcomes the drawbacks described above.

SUMMARY OF THE INVENTION

To accomplish the objectives of the present invention, there is provided a handlebar assembly for a motorcycle that has a cylindrical connecting rod having opposing first and second ends, a first end joint connected to the first end, and a second end joint connected to the second end. Each end joint has a vertical channel. The handlebar assembly also includes a first handlebar and a second handlebar, each handlebar having a vertical bar that has an upper end, and a lower end that is removably secured inside the vertical channel of one of the end joints. Each handlebar bar also includes a horizontal bar extending from the upper end of the vertical bar and terminating in a hand grip.

The cylindrical connecting rod can be secured inside a longitudinal channel of a clamp. The clamp can have two clamp legs that are secured to the two clamp joints of the triple tree clamp of a motorcycle.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 2:
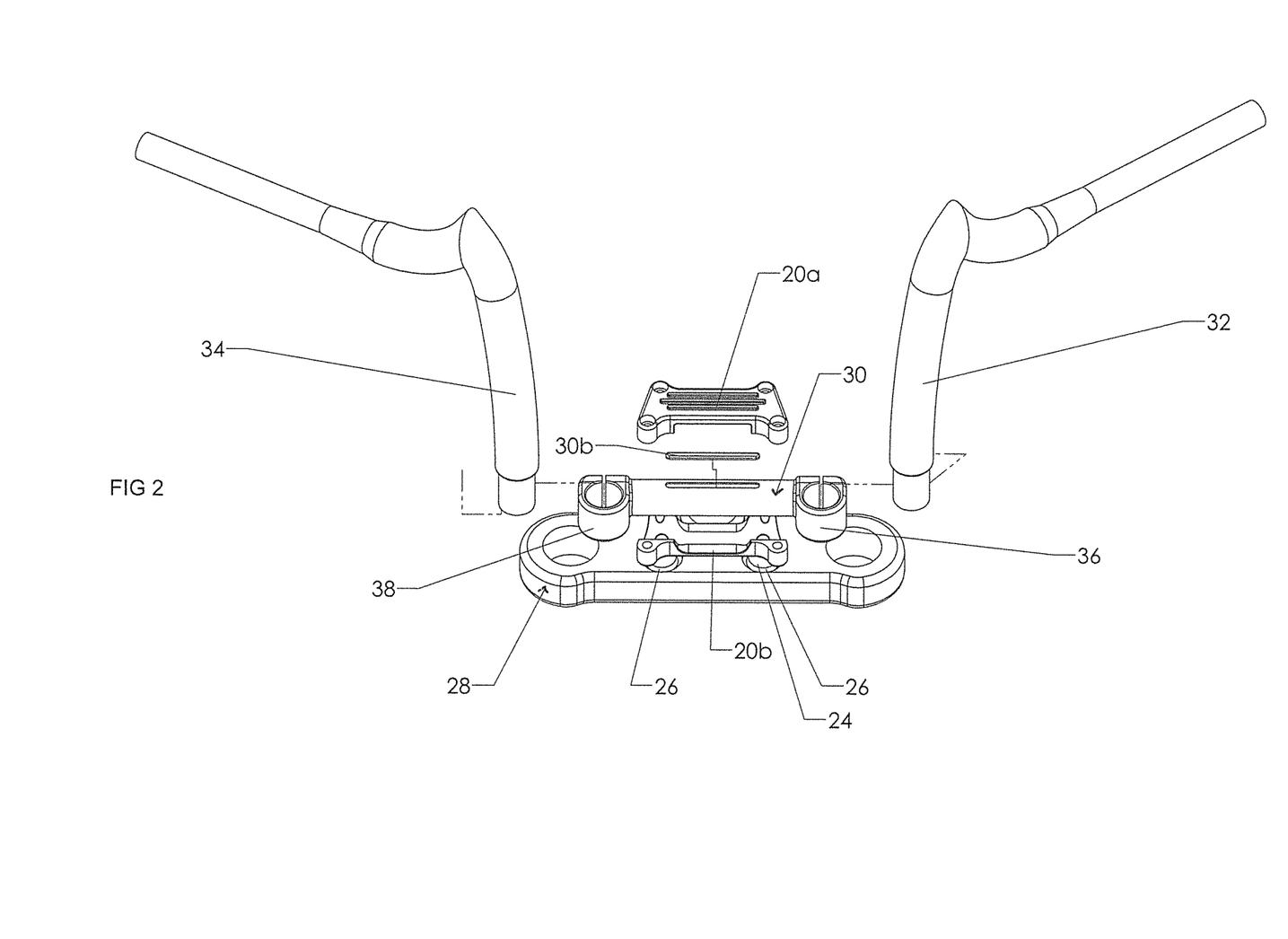
FIG. 2 is an exploded front perspective view of a handlebar assembly according to one embodiment of the present invention shown in use with the clamp of FIG. 1.

FIGS. 2-6 illustrate a handlebar assembly according to one embodiment of the present invention. The assembly includes a connecting rod 30, and two handlebars 32 and 34, that are adapted for use with the clamp 20 that was shown and described in connection with FIG. 1. As best shown in FIG. 2, the lower clamp piece 20b has two clamp legs 24 that are secured to two clamp joints 26 of the triple tree clamp 28 of the motorcycle. The connecting rod 30 is secured inside the channel 22 of the clamp 20 and has two end joints 36 and 38. The handlebars 32 and 34 are sized and configured to be secured inside the end joints 36 and 38, respectively.

Figure 3:
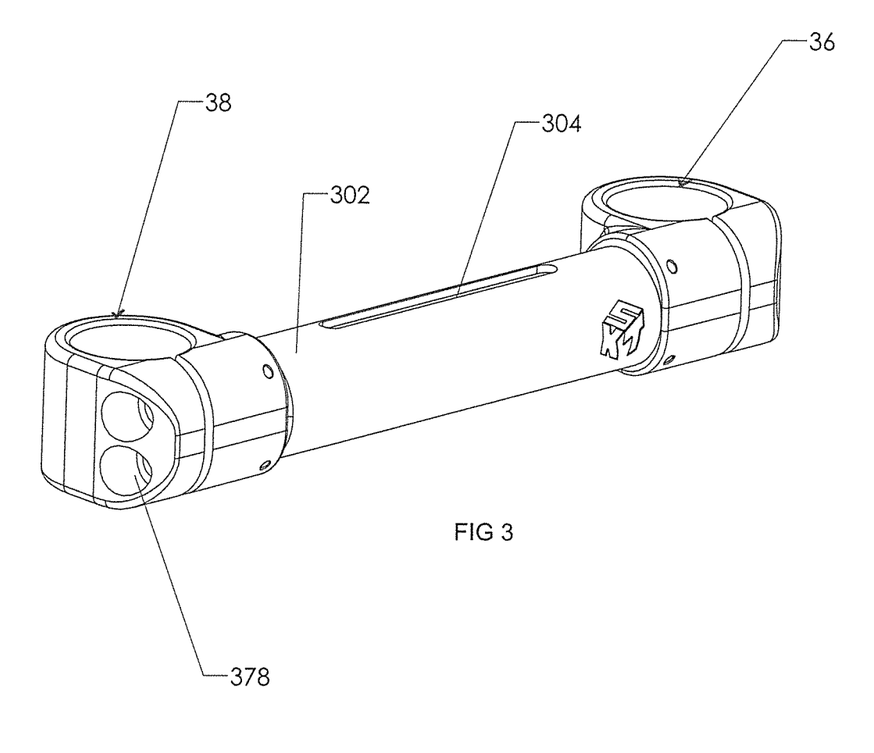
FIG. 3 is a perspective view of the handlebar assembly of FIG. 2.

The connecting rod 30 is illustrated in FIG. 3. The connecting rod 30 has a generally cylindrical connecting central rod 302 that is generally made of aluminum or stainless steel. The central rod 302 has an outer diameter that is sized and configured to fit snugly inside the channel 22 of the clamp 20. An elongated slot 304 is provided along the outer surface of the central rod 302, and a friction element 306 (see FIG. 2) is secured inside the slot 304. The friction element 306 can be a rubber piece or a piece of material made from any material that provides friction. The friction element 306 prevents the central rod 302 from rotational movement inside the channel 22. Each end joint 36 and 38 is secured to an opposite end of the central rod 302.

Figure 4A:
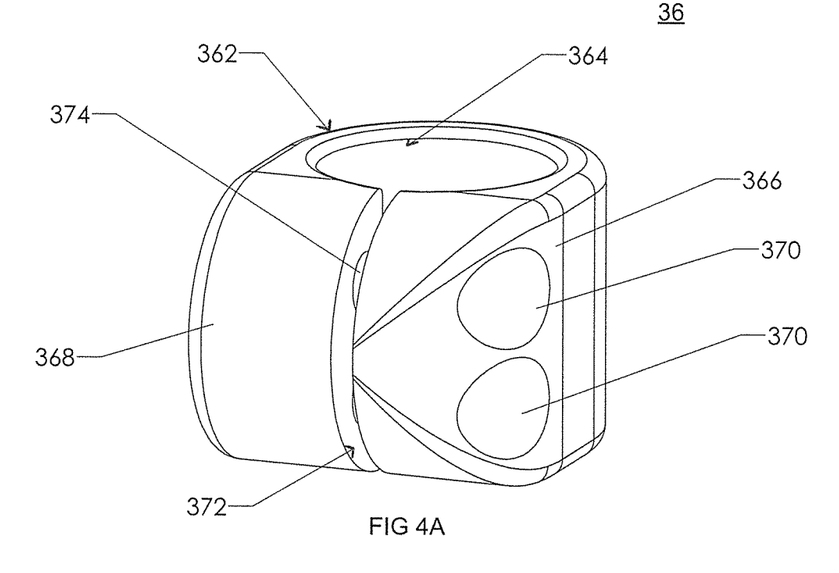
FIGS. 4A and 4B are two different perspective views of an end joint for the handlebar assembly of FIG. 2.
Figure 4B:
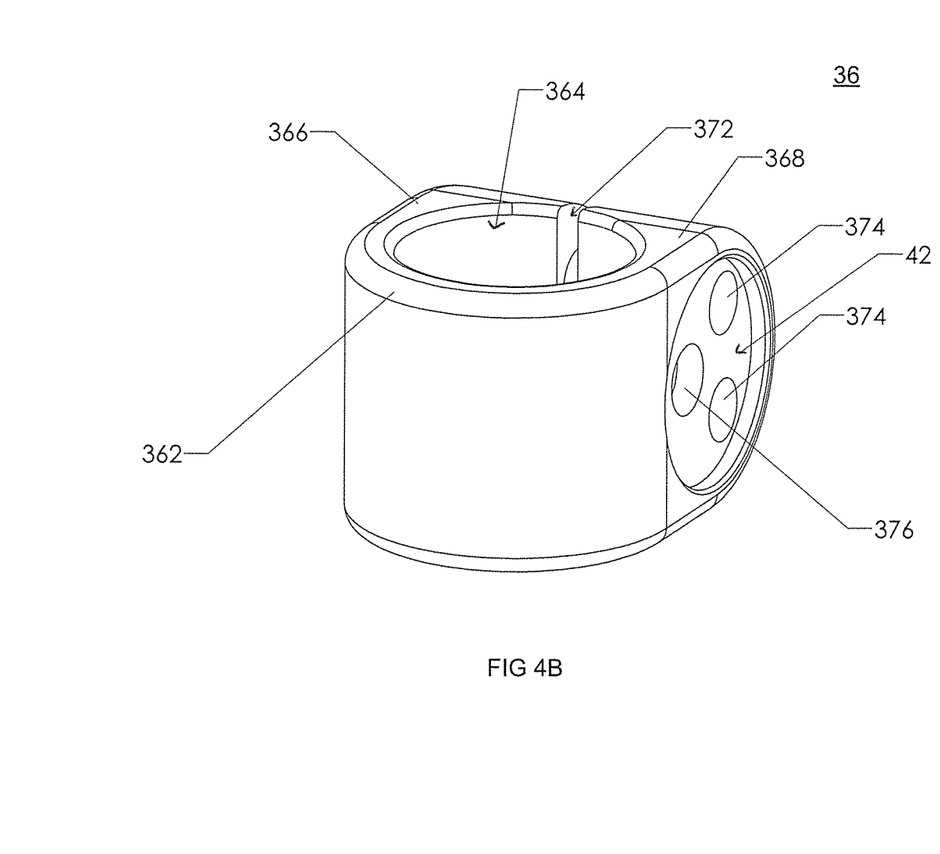

Referring to FIGS. 4A and 4B, the end joint 36 has a generally U-shaped body 362 that defines an annular vertical channel 364 for retaining a lower end of the handlebar 32. The two opposite ends of the U-shaped body 362 include a screw housing 366 and a connector section 368. The connector section 368 is secured to the end of the central rod 302, and the screw housing 366 includes at least one threaded bore 370. The connector section 368 also has at least one threaded bore 374 that is aligned with the threaded bore(s) 370 of the screw housing 366. A space 372 is defined between the screw housing 366 and the connector section 368. In use, the lower end of the handle bar 32 is received inside the channel 364, and then at least one screw or threaded bolt 378 is inserted into the threaded bore(s) 370 and extends into the threaded bore(s) 374. As the screw or threaded bolt 378 is turned, it causes the screw housing 366 and the connector section 368 to move towards each other and reduce the space 372, which in turn compresses the channel 364 and thereby secures the lower end of the handle bar 32 tightly inside the channel 364.

Figure 4C:
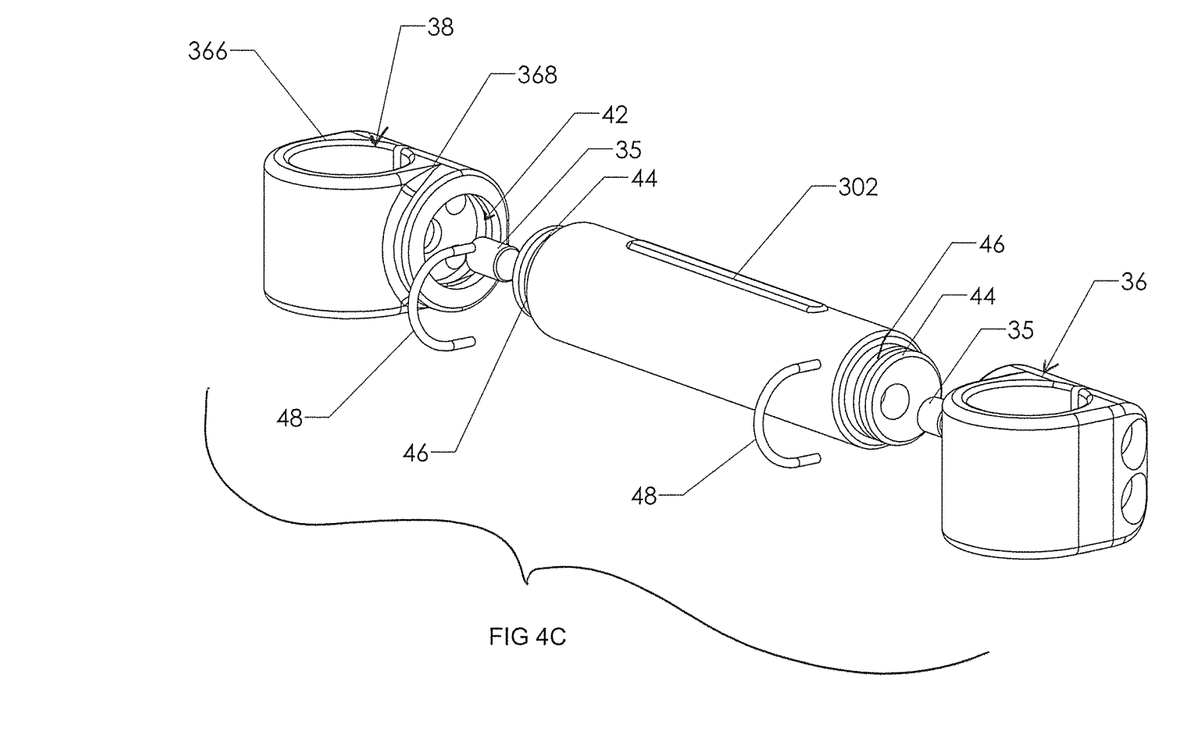
FIG. 4C is an exploded perspective view of another embodiment of the handlebar assembly.

The other end joint 38 has the same construction as the end joint 36, and the other handlebar 34 is secured to the end joint 38 in the same manner as for the handlebar 32 and the end joint 36. The end joints 36 and 38 can be provided (e.g., by molding or welding) in one piece with the connecting rod 30 to form one solid part. Alternatively, the end joints 36 and 38 can be provided as separate pieces from the connecting rod 30, and in this embodiment, the outer surface of the connector section 368 can be provided with a connection well 42 that includes the bore(s) 374 and a dowel pin hole 376 which is offset from the center of the connection well 42. In this embodiment, each opposite end of the central rod 302 has a dowel pin 35 which is adapted to be received inside the dowel pin hole 376, and an annular joint 44 which is adapted to be secured inside the connection well 42 by force-pressing. A semi-circular cord groove 46 can be provided at the annular joint 44, and a cord 48 can be retained inside the cord groove 46 to lock the annular joint 44 inside the connection well 42. The force-pressing of the annular joint 44 into the connection well 42 should be enough to hold the two parts together, and offsetting the dowel pin 35 from the center of the two parts (end joint 36/38 and annular joint 44) means that the two parts cannot rotate. However, if a force is applied outwardly, there is a concern that the end joint 36 or 38 could be pushed off the central rod 302. Therefore, providing a semi-circular cord groove 46 and running a cord 48 through both parts would make it impossible to pull them apart. In this regard, the cord 48 can be a hard nylon or a wire both which will not compress.

One benefit of providing the connecting rod 30 and the end joints 36 and 38 in separate pieces is to allow for connecting rods 30 of different diameters or lengths to be fitted into different-sized channels 22 of the clamp 20.

Figure 5:
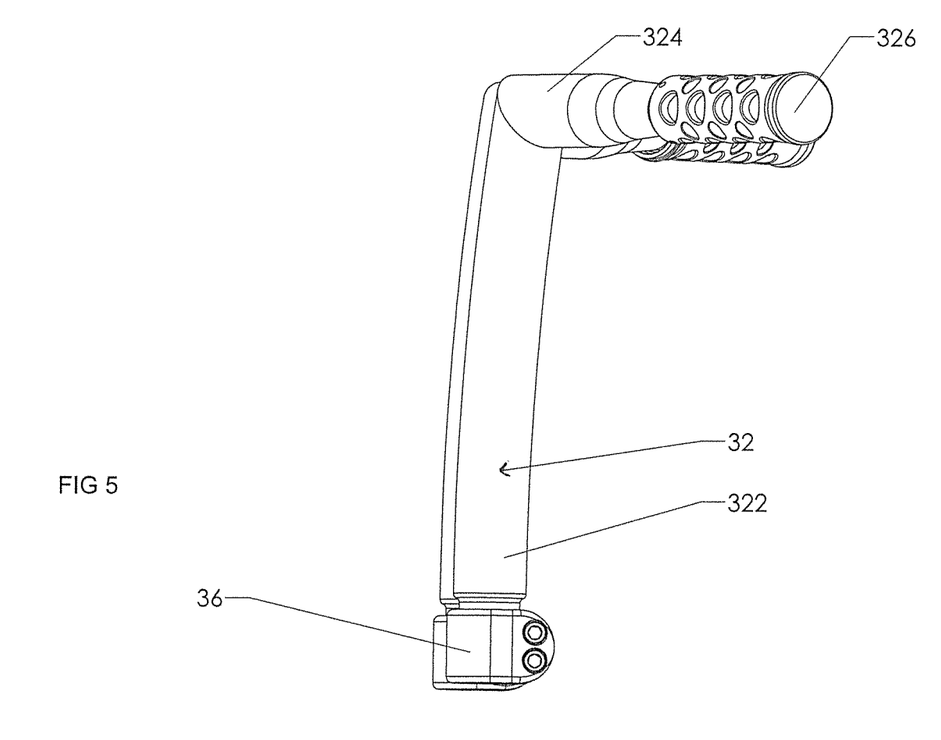
FIG. 5 is a side view of the handlebar assembly of FIG. 2.
Figure 6:
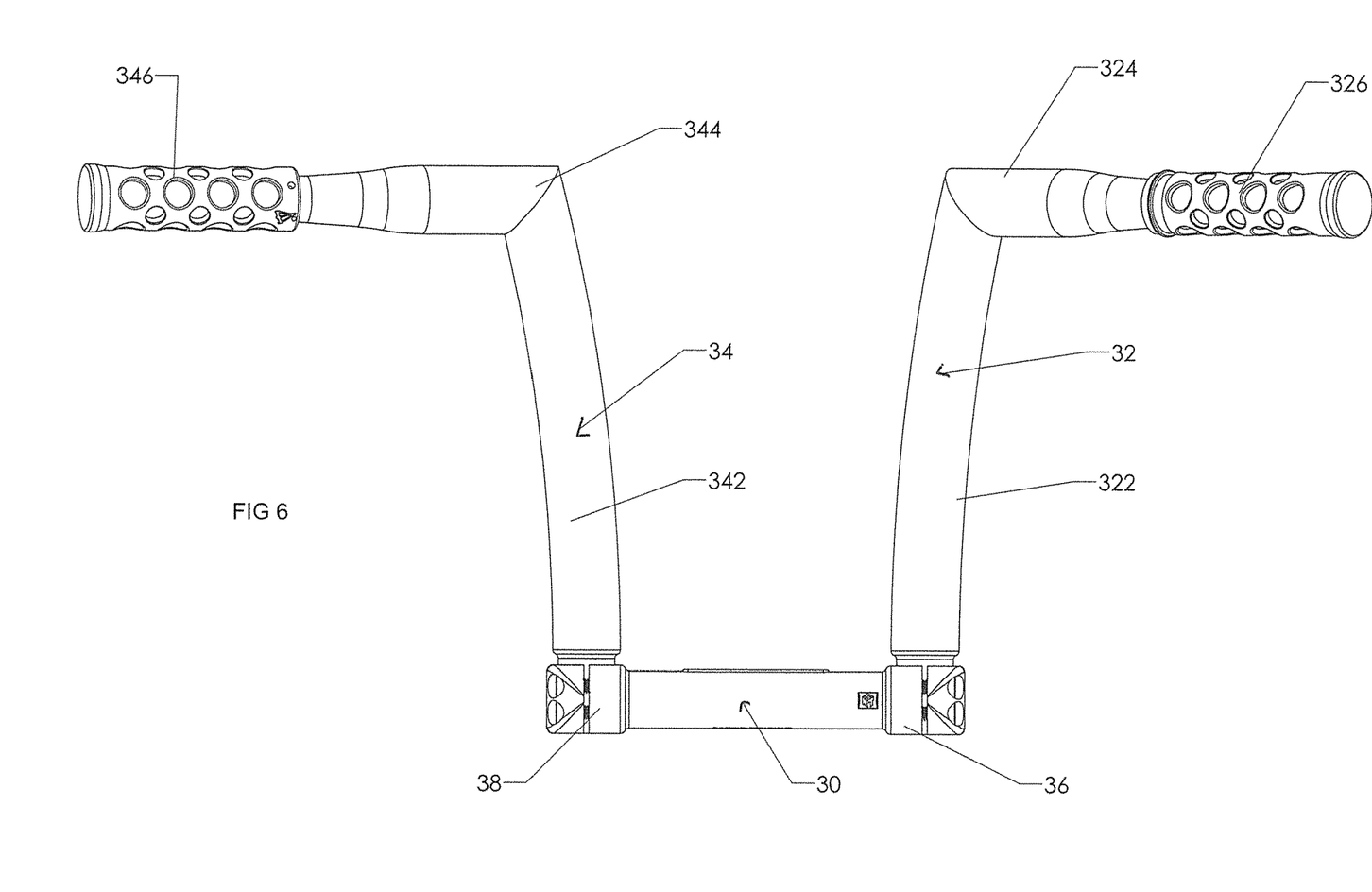
FIG. 6 is a front view of the handlebar assembly of FIG. 2.

Referring to FIGS. 5 and 6, each handlebar 32 and 34 has a vertical bar 322 and 342, respectively, having a lower end that is removably secured to the end joint 36 and 38, respectively, in the manner described above. Each vertical bar 322 and 342 can be slightly curved, flaring slightly outwardly from its lower end to its upper end as shown in FIG. 6. A horizontal bar 324 and 344 extends horizontally away from the upper end of each vertical bar 322 and 324, respectively, in a manner where their hand grips 326 and 346, respectively, are furthest away from each other.

Figure 7:
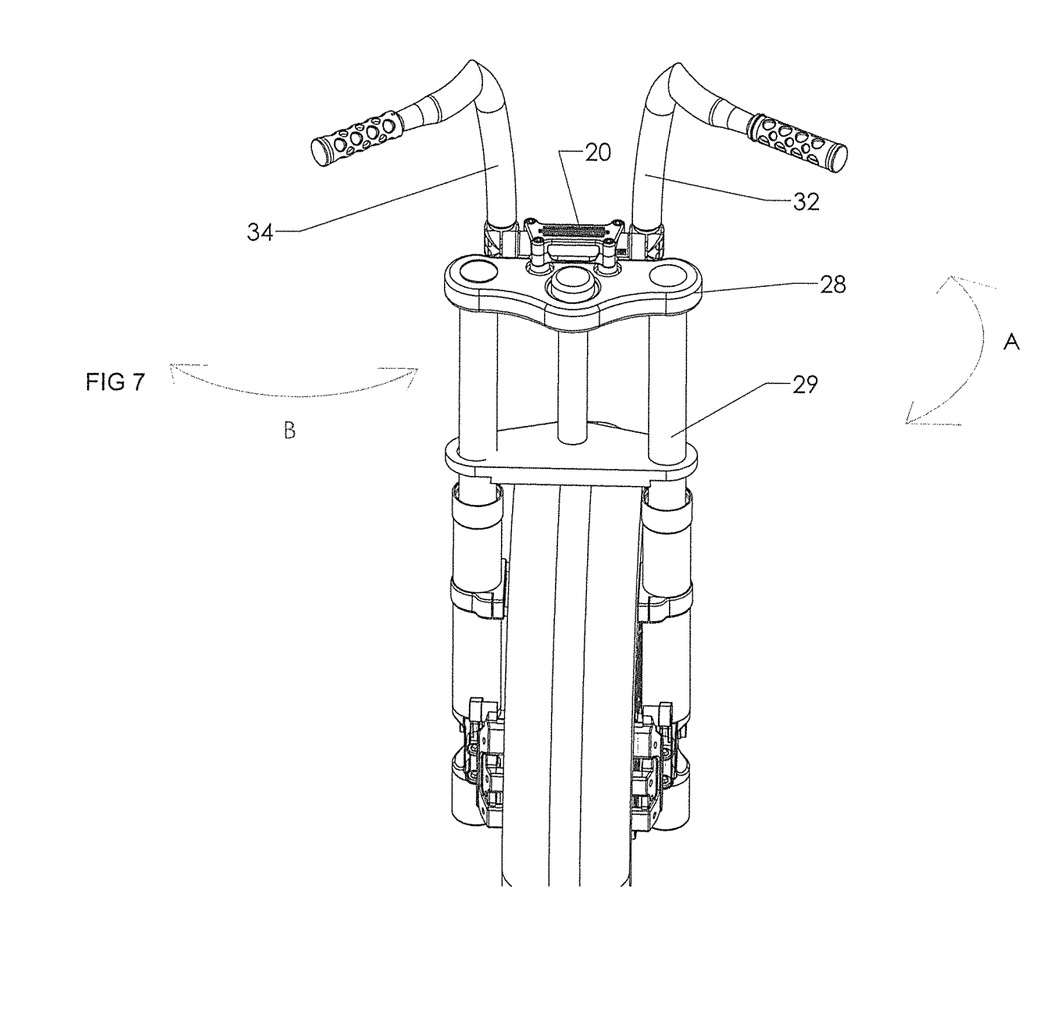
FIG. 7 illustrates the clamp of FIG. 1 and the handlebar assembly of FIG. 2 deployed in use on a motorcycle.

FIG. 7 illustrates the clamp 20 of FIG. 1 and the handlebar assembly of FIG. 2 deployed in use on a motorcycle. The triple tree clamp 28 is positioned on front forks 29. The angular orientation of the handlebars 32 and 34 can be adjusted by rotating the handlebars 32, 34 inside the end joints 36 and 38 (see arrow B) as well as rotating the connecting rod 30 inside the channel 22 (see arrow A) before the clamp pieces 20a and 20b are tightened. This multi-plane adjustment allows for individual positioning to suit various riders. In addition, the rider can change to different handlebars 32 and 34 depending on his or her desired mood, since the channel 364 in the end joints 36 and 38 can be varied in size to accommodate handlebars having differently sized lower ends.

Figure 8:
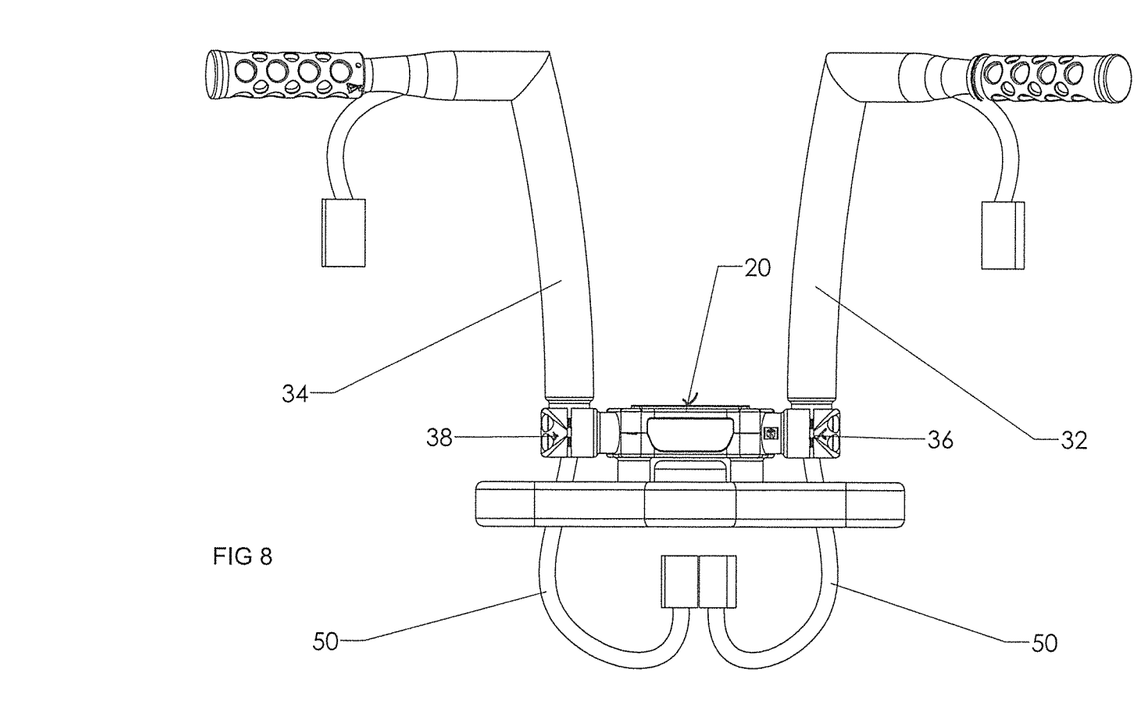
FIG. 8 illustrates the wiring for the handlebar assembly of FIG. 2.

FIG. 8 illustrates another benefit provided by the clamp 20 of FIG. 1 and the handlebar assembly of FIG. 2. The wire looms 50 can be run directly from the motorcycle through each separate end joint 36, 38 into the separate handlebars 32 and 34. In contrast, in the conventional Harley-Davidson™ system, the wire looms must go through the rod 21 from the clamp 20, thereby making the wiring more complicated, and requiring longer wires.

Figure 9:
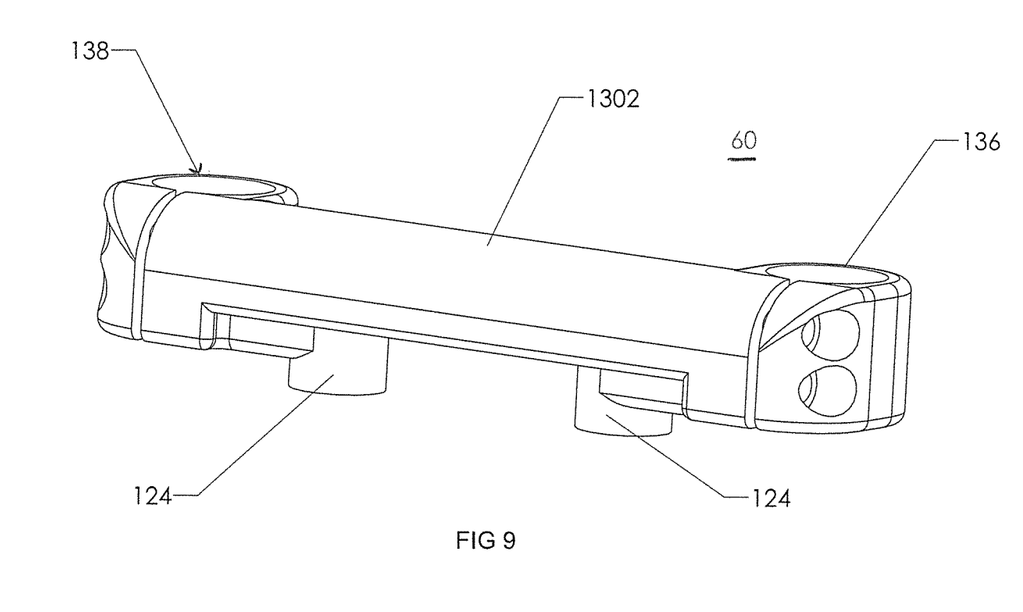
FIG. 9 is a perspective view of a handlebar assembly according to another embodiment of the present invention.

FIG. 9 illustrates a handlebar assembly 60 according to another embodiment of the present invention. The assembly 60 has a central rod 1302 that can be the same as the central rod 302, and two end joints 136 and 138 that can be the same as the end joints 36 and 38, respectively. The difference between the assembly 60 and the assembly 30 in FIG. 3 is that the central rod 1302 and end joints 136 and 138 are provided in one piece. In addition, the lower side of the central rod 1302 has two clamp legs 124 that are adapted to be secured to two clamp joints of the triple tree clamp 28 of the motorcycle. These clamp legs 124 can be the same as the clamp legs 24 in the clamp 20. Thus, when the assembly 60 is used, the clamp 20 is omitted and the central rod 1302 can be directly clamped to the two clamp joints of the triple tree clamp 28 of the motorcycle via the clamp legs 124.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A motorcycle having:
   a triple tree clamp that has two clamp joints;
   a clamp having two clamp legs that are secured to the two clamp joints of the triple tree clamp, the clamp having a longitudinal channel extending therethrough; and
   a handlebar assembly for a motorcycle, comprising:
   a cylindrical connecting rod having opposing first and second ends;
   a first end joint connected to the first end, and a second end joint connected to the second end, wherein each end joint has a vertical channel; and
   a first handlebar and a second handlebar, each handlebar having a vertical bar that has an upper end, and a lower end that is removably secured inside the vertical channel of one of the end joints, wherein each handlebar bar also includes a horizontal bar extending from the upper end of the vertical bar and terminating in a hand grip;
   wherein the cylindrical connecting rod is secured inside the longitudinal channel;
   a wire loom that extends from the motorcycle through at least one of the end joints and into one of the handlebars;

wherein the connecting rod and the first and second end joints are provided in separate pieces; and wherein each end joint has a connection well, and the connecting rod has opposite first and second ends, with each of the first and second ends having an annular joint that is secured inside a connection well of a separate end joint.

2. The motorcycle of claim 1, wherein the connecting rod and the first and second end joints are provided in one piece.

3. The motorcycle of claim 1, wherein each of the first and second ends of the connecting rod has a dowel pin, and each connection well has a dowel pin hole for receiving a separate dowel pin.

4. The motorcycle of claim 1, wherein the vertical channel of each end joint is compressed when the lower end of a handlebar is positioned inside the vertical channel.

\* \* \* \* \*